Figure 1:
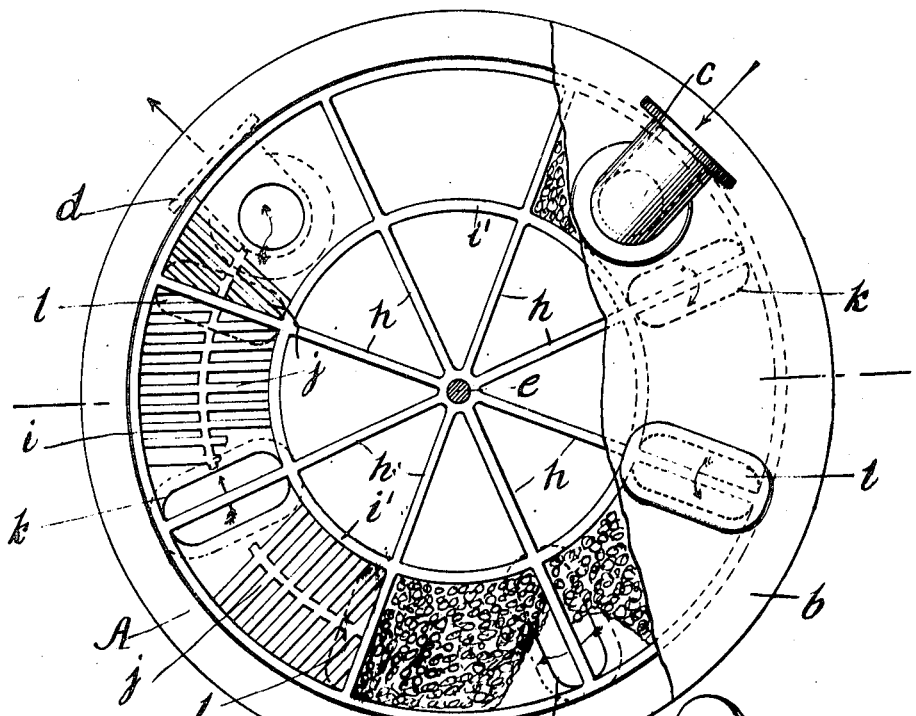

W. M. GROSVENOR.
METHOD OF CONDUCTING CATALYTIC REACTIONS.
APPLICATION FILED AUG. 7, 1908.

1,036,610.

Patented Aug. 27, 1912.
3 SHEETS—SHEET 1.

WITNESSES

INVENTOR:
William M. Grosvenor,
by
ATTORNEYS.

W. M. GROSVENOR.
METHOD OF CONDUCTING CATALYTIC REACTIONS.
APPLICATION FILED AUG. 7, 1908.
1,036,610.
Patented Aug. 27, 1912.
3 SHEETS—SHEET 2.
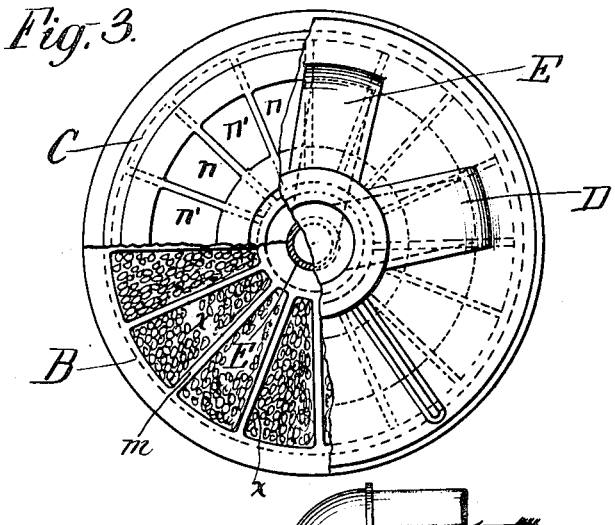
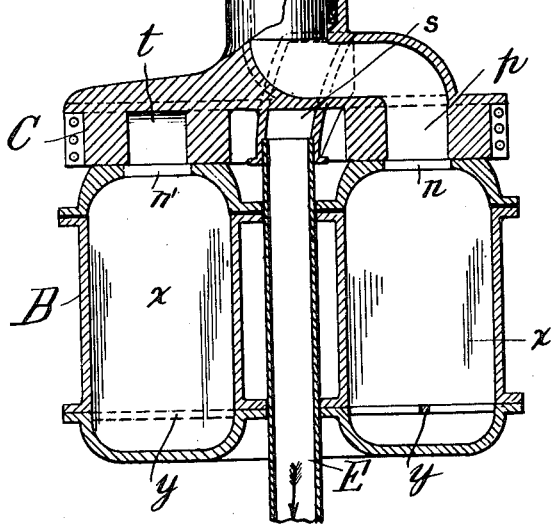
WITNESSES
INVENTOR:
William M. Grosvenor,
by
ATTORNEYS W. M. GROSVENOR.
METHOD OF CONDUCTING CATALYTIC REACTIONS.
APPLICATION FILED AUG. 7, 1908.
1,036,610.
Patented Aug. 27, 1912.
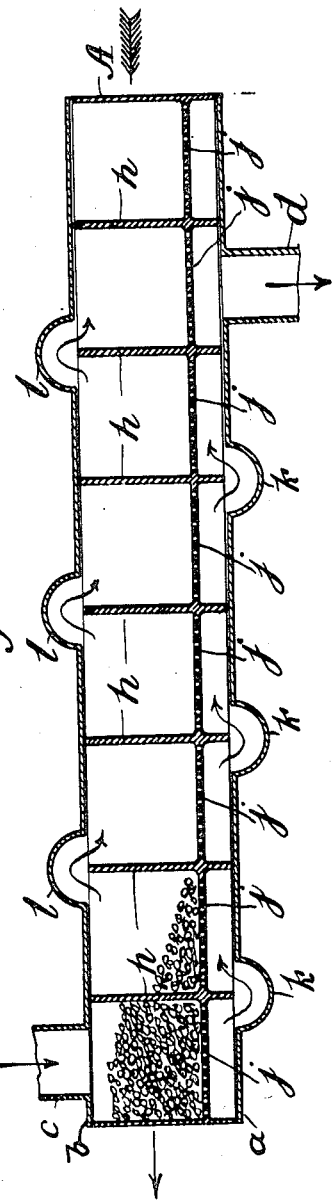
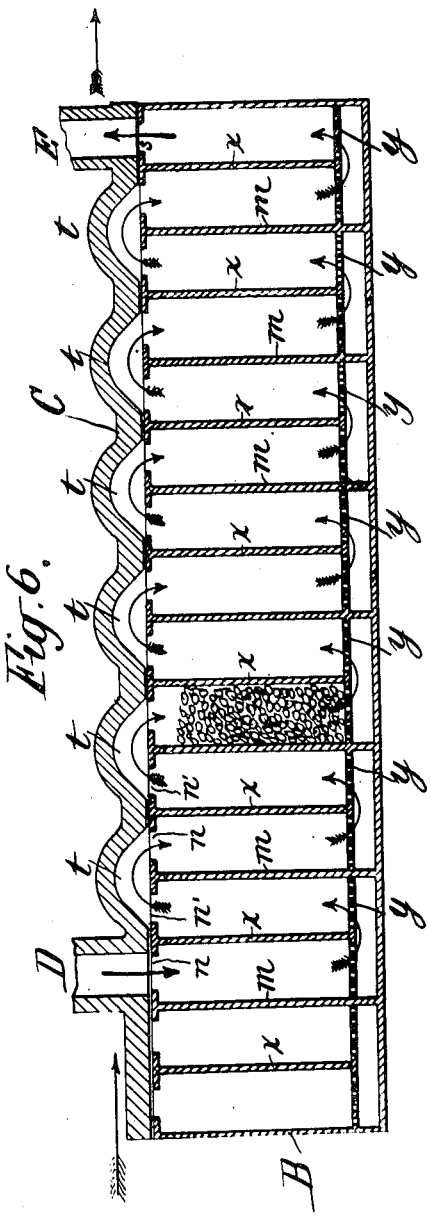

UNITED STATES PATENT OFFICE.

WILLIAM M. GROSVENOR, OF NEW YORK, N. Y.

METHOD OF CONDUCTING CATALYTIC REACTIONS.

1,036,610.  Specification of Letters Patent.  Patented Aug. 27, 1912.

Application filed August 7, 1908. Serial No. 447,405.

*To all whom it may concern:*

Be it known that I, WILLIAM M. GROSVENOR, a citizen of the United States, residing at New York, in the county of New York and State of New York, have invented certain new and useful Improvements in Methods of Conducting Catalytic Reactions; and I do hereby declare the following to be a full, clear, and exact description of the invention, such as will enable others skilled in the art to which it appertains to make and use the same.

My invention relates to certain new and useful improvements in the method of conducting catalytic or contact operations, as, for instance, the conversion of $SO_2$ and $O_2$ into $SO_3$ by the use of platinized bodies.

In carrying out my invention, I admit, into the converting chamber, a mixture of the gases to be converted, at a low temperature, and yet maintain the appropriate conditions for commercial maximum conversion. I thereby avoid all expenditure of fuel for preliminary heating of the mixture, (except when very weak gases are employed), and, indeed, may jacket the converting chamber to the limit dictated by good practice, to the advantage of the conversion. The converted gases issuing from the chamber are correspondingly low in temperature, which is favorable to their subsequent absorption, or condensation. The admission into the converting chamber of a mixture of the gases to be converted, at the low temperature contemplated by me, and without preliminary heating, is accompanied with the phenomenon that the zone of reaction tends to recede from the gas inlet at a rate depending on the richness of the gases and the heat of their reaction. This is due to the fact in exothermic conversions that the partial conversion of cold gas on the surface of the contact mass does not generate enough heat to maintain the temperature of said contact mass and it, therefore, cools below the temperature of activity. If means are provided for sustaining the temperature of the contact mass, where the cold gases enter it, no such difficulty is experienced. This is the particular subject of my invention, and I attain it in either of two ways, to wit: 1, by moving the contact mass forward along the path of the gases; or 2, by shifting the gas inlet ports and gas outlet ports backward along the contact mass.

Figure 2:
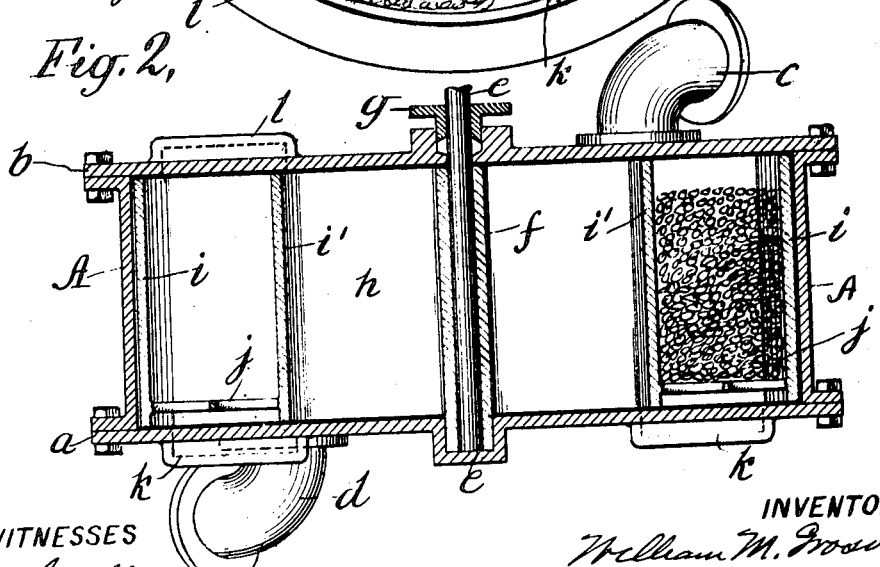

In the accompanying drawings, Figure 1 represents in plan view and with the cover partially removed, one form of apparatus suitable for the practice of my invention in which an endless circuit of the contact mass and an open circuit of the gases are relatively progressed through one another in a counter-current by making the gas inlet and outlet stationary and moving the parts of the contact mass toward the gas outlet. Fig. 2 represents a cross sectional view thereof: Figs. 3 and 4 represent like views of another form of apparatus for the same purpose in which an endless circuit of the contact mass and an open circuit of the gases are relatively progressed through one another in a counter-current by making the gas inlet and outlet move with respect to portions of the contact mass in the direction of the gaseous current. Fig. 5 represents diagrammatically the course taken by the gases in the form of apparatus shown in Figs. 1 and 2; and Fig. 6 represents diagrammatically the course taken by the gases in the form of apparatus shown in Figs. 3 and 4.

Similar letters of reference indicate similar parts throughout the several views.

Referring to Figs. 1 and 2, $a$ indicates the bottom plate and $b$ the top plate of a converting apparatus, which receives its mixture of gases to be converted through the inlet pipe $c$ attached to the cover plate, and which delivers the converted gases into the exit pipe $d$ attached to the bottom plate. The inlet and outlet pipes communicate with the interior of the converter and, for convenience in operating, bear a fixed relation to each other. Stepped in a suitable bearing in the bottom plate is a hub $f$ carried by the rotatable shaft $e$ passing through a stuffing box $g$ in the cover plate, and adapted to be rotated at intervals, step by step, by any suitable means. The shaft $e$ is provided with a series of radial arms or partitions $h$, as shown, which may conveniently be, say, eight in number. These radial partitions extend from the central hub $f$ and carry the concentric walls $i$, $i'$, and in each of the outer subdivisions thus provided there is arranged a grated or perforated bottom $j$ upon which rests the contact material, which is preferably platinized asbestos or precipitated or reduced platinum which may be supported on any other suitable material having a moderately high specific heat and which is a good heat conductor. Between the inlet pipe *c* and the outlet pipe *d* in the direction of movement of the gases the bottom plate of the converter is provided with three pockets or depressions *k*, alternating with three similar pockets *l* in the cover plate. The under side of the cover plate *b*, the upper side of the bottom plate *a*, and the top and bottom faces of the partitions and of the walls *i*, *i'*, are all machined or otherwise fitted as accurately as possible. As a consequence, the gases entering at *c* pass through the contact mass in the first compartment, thence through the second compartment and so on around seven eighths of the circle through the next succeeding compartments until they reach the seventh compartment of the series; whereupon they pass out through the outlet pipe *d*. The gases are prevented from passing directly to the outlet pipe compartment for the reason that there are no by-pass pockets in the cover plate or in the bottom plate at that point; so that the eighth compartment (whichever it may be) is out of the circulation and represents practically a dead space. In Fig. 5, the course of the gases is indicated diagrammatically, the circular series of compartments being assumed therein to be developed on a plane surface. In this figure, the curved arrow shows the course of the gases, and the straight, longitudinal arrow indicates the direction in which the position of the compartments is shifted from time to time in accordance with and for the purposes of my invention.

In the form of apparatus shown in Figs. 3 and 4, instead of shifting the contact mass itself, the port for the admission of the gas to be converted is shifted successively forward, in pursuit of the receding zone of maximum temperature, and the port for the exit of the converted product is correspondingly shifted. In said Figs. 3 and 4, B indicates an annular converter, divided by a series of radial partitions *m* extending from top to bottom thereof into a corresponding number of individual compartments, say eight in number. These compartments have inlets *n* and outlets *n'* at the top and are further provided with depending dividing walls *x*, and with perforated bottoms *y* upon which rests the contact material; so that each compartment is of general U-shape in vertical cross-section. The upper surface of the annular chamber B is machined off to make a gas-tight joint with the machined under surface of a rotary valve structure C, which is provided with a port *p* always in communication with the inlet pipe D for the gases to be converted, and with a port *s* always in communication with the exit pipe E for the outflow of the converted gases, these two ports being spaced apart a distance corresponding to seven compartments on one side, and one compartment on the other, as indicated. The pipe E also serves as a shaft about which the valve structure may be ro- P. A. GUYE, G. DARIER & A. VAN VLOTEN.
PROCESS OF MANUFACTURE OF ALKALINE AND EARTHY ALKALINE NITRATES.
APPLICATION FILED JUNE 25, 1910.
1,036,611. Patented Aug. 27, 1912.
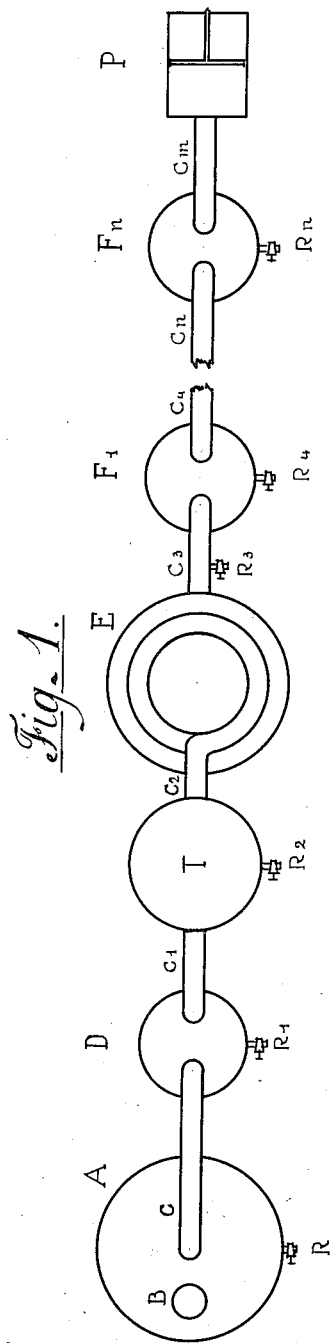
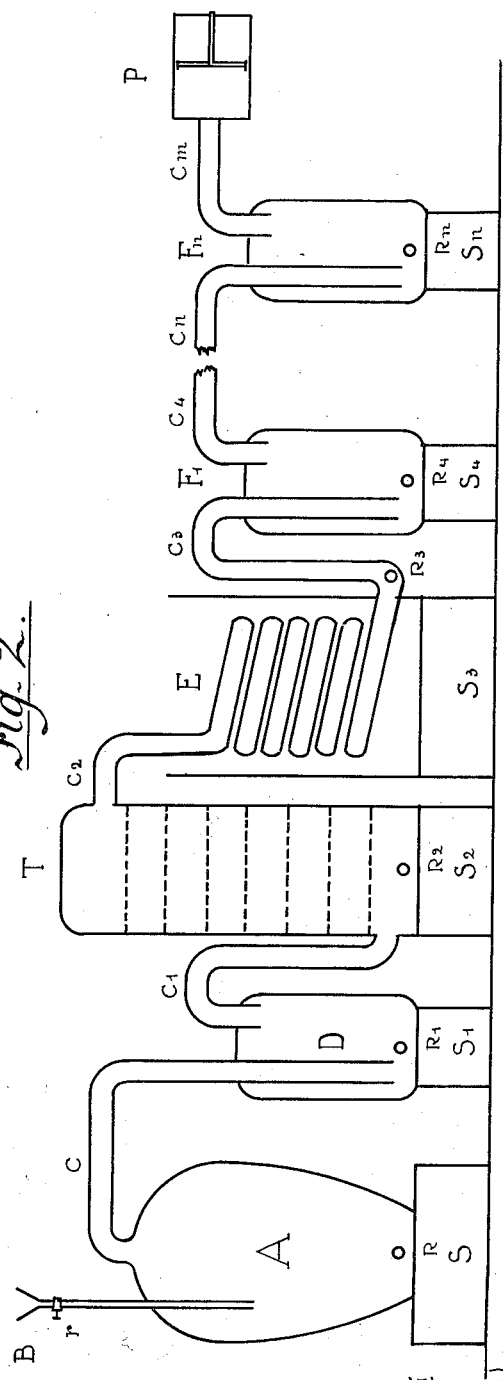

In carrying out my invention, for the conversion of $SO_2$ and $O_2$ into $SO_3$ with the type of apparatus shown in Figs. 1 and 2 just described, I first heat the entire chamber and its contents to about 420° C. This may be done by preheating the entering gases, if desired, or in any other manner, and is but an initial expedient. The cold mixture of gases is then slowly turned on. The hot contact material thereupon initiates conversion in the slow current of gases, but the cold gases reduce the temperature of the material they first meet and gradually cool the entire contents of the first compartment. The heat produced by this initial reaction, however, together with the heat taken up by the gas current from the contact material in the first compartment, so far raises the temperature of the gas that very rapid reaction takes place in the two next succeeding compartments and the gas and contact material therein attain an unnecessary temperature. If now, the revoluble system of compartments were permitted to remain at rest, the cold zone and the overheated zone would progressively recede from the inlet compartment, the conversion would be complete for a time only, and the contact mass would cool down progressively, the heat being carried away with the exit gases. The whole mass would finally become cold and the reaction would cease altogether. By means of my invention, however, this cessation of the converter's activity is entirely obviated. By a partial rotation of the shaft in the direction toward the inlet pipe, I shift the cold compartment of the inactive or "dead" position, and consequently present the next succeeding and still hot compartment to the action of the entering gases. In like manner, and at appropriate intervals, I advance the third, the fourth, etc., compartments, in succession, to the inlet position, thereby presenting successively fresh portions of sufficiently heated contact material to meet the cool entering gases. At the same time, the cool compartments, after passing the exit are advanced to meet the gases which are progressing from the zone of maximum temperature toward the exit. These cool compartments serve to cool the gases down below the temperature of complete reaction, ordinarily far below it, so that they leave the apparatus in a relatively cool state, and without interfering in any way with the smooth progress of the operation. In other words, in this case, I transfer the heat within the contact chamber by transferring or shifting the hot or cold contact mass itself in such manner that local conditions at various points of the gaseous current are so maintained as to insure complete reaction.